E. L. ACKERMAN.
JOINT OR HINGE FOR WIND SHIELDS.
APPLICATION FILED JULY 25, 1912.
1,121,576.
Patented Dec. 15, 1914.
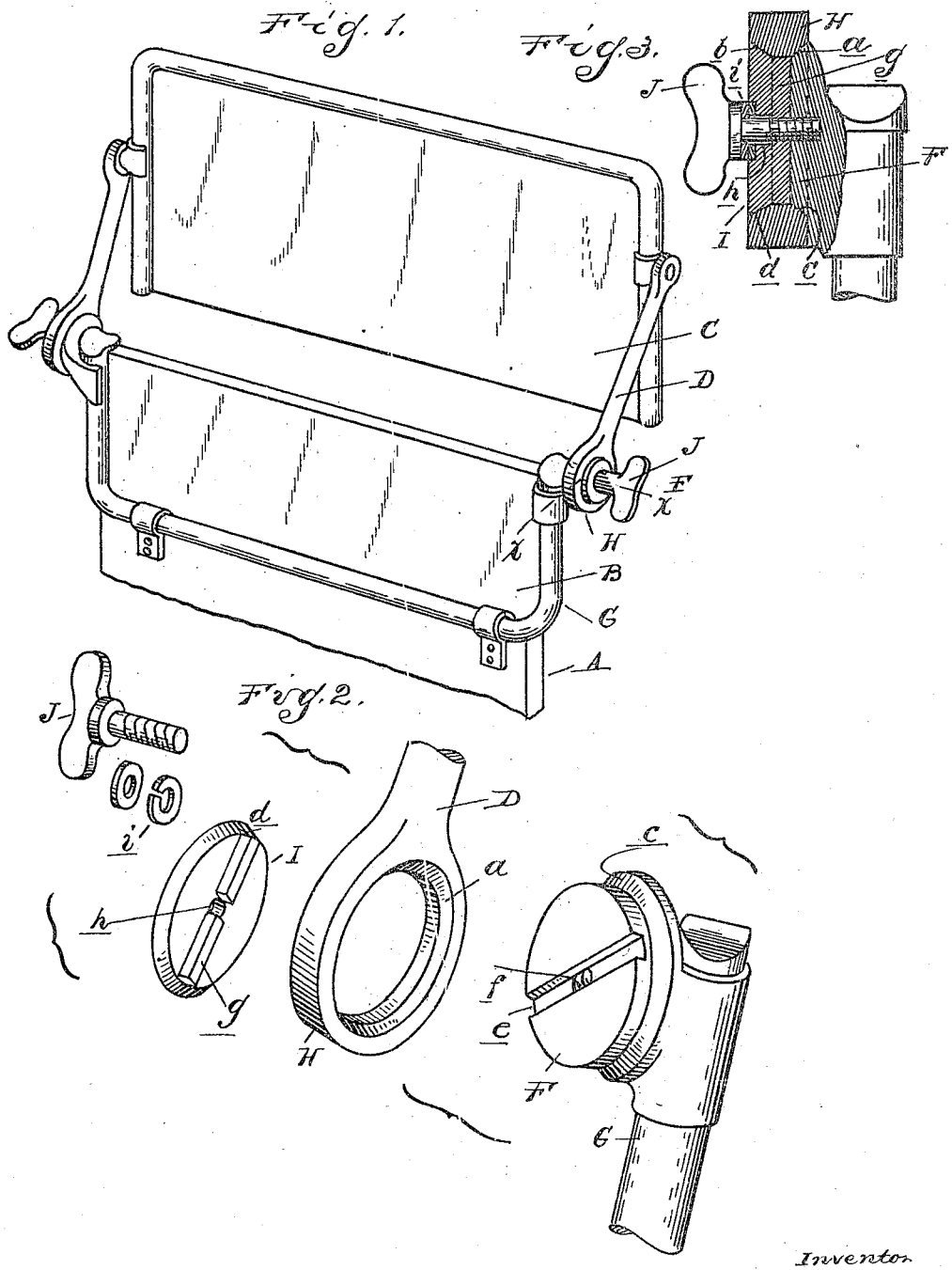
Witnesses
W. K. Ford
James O. Barry
Inventor
Edward L. Ackerman
By Whittemore, Hulbert & Whittemore
attys.

UNITED STATES PATENT OFFICE.

EDWARD L. ACKERMAN, OF DETROIT, MICHIGAN.

JOINT OR HINGE FOR WIND-SHIELDS.

1,121,576.  Specification of Letters Patent.  Patented Dec. 15, 1914.

Application filed July 25, 1912. Serial No. 711,604.

*To all whom it may concern:*

Be it known that I, EDWARD L. ACKERMAN, a citizen of the United States of America, residing in the city of Detroit and county of Wayne, State of Michigan, have invented certain new and useful Improvements in Joints or Hinges for Wind-Shields, of which the following is a specification, reference being had therein to the accompanying drawings.

The invention relates generally to wind-shields of the sectional type and more particularly to a friction hinge connection between the shield members, permitting relative adjustment between the parts.

It consists essentially in the construction of the hinge and the peculiar arrangement and combination of parts thereof and the various details of construction as more fully hereinafter set forth.

In the drawings: Figure 1 is a perspective view of an embodiment of my invention; Fig. 2 is a view in perspective of the parts of the joint or hinge, detached; and Fig. 3 is a vertical central section taken on line $x-x$ of Fig. 1.

In the drawings just described A designates a suitable support on which the wind-shield is mounted; B is the lower section of the shield and C the upper, and D are arm supports for the upper section C.

E represents the hinge connections between the arm supports and the lower section, the friction afforded by the joint being variable as and for the purpose hereinafter set forth.

The hinge is preferably of the following construction: Comprising a circular head F secured to the upper portion of the frame G of the lower section; a tubular bearing H carried by each arm; a friction member, preferably in the form of a disk; and means for holding the parts in their assembled position—the preferred means for this purpose being the wing-bolt J.

Formed upon the tubular bearing member H interiorly thereof are conical bearing surfaces $a$ and $b$. The head F is likewise provided with a conical surface $c$, adapted to engage one of the bearing surfaces on the tubular member; and it is further provided with a transverse slot $e$ and a central aperture $f$ interiorly screw-threaded.

The friction member I is preferably formed with a conical bearing surface $d$, with a rib or projection $g$ adapted to fit the recess $e$, and a central opening $h$.

With the parts assembled, they are in the position shown in Fig. 3, the wing-bolt engaging the openings in the head and friction member and thus uniting the parts and holding the respective conical bearing surfaces in engagement, while the rib $g$ in engaging its recess $e$ prevents relative rotation between the members I and F and thereby increases the friction of the joint. For the purpose of holding the bolt from relative movement after adjustment is once effected, a nut-lock, of any suitable type—such as $i$, is employed, interposed between the member I and the head of the screw or pivot.

With the construction described, it will be obvious that as the members I and F are brought into engagement with their respective bearing surfaces upon the member H the desired friction will be produced, thus permitting the upper section of the shield to be shifted in the position desired and maintained in said position against ordinary shocks and jars, while, at the same time, the friction is not so great but that the shield sections can be adjusted readily by the hand of the operator. On the other hand, if it is desired to positively lock the shield section in any position, this may be effected by clamping the members of the joint or hinge tightly together, through the agency of the wing-bolt. Thus the friction of the joint or hinge may be readily varied for the purpose desired.

While I have shown the preferred form of joint it will be obvious that various modifications can be made without departing from the spirit of my invention. For instance, the conical bearing surface on one of the joint members and the corresponding friction surface upon its complementary member might be omitted if desired, and the joint would still afford sufficient friction for the purpose for which it is intended; likewise, in place of the particular means for effecting the adjustment between the joint members, other suitable means might be employed for performing the same function. I do not, therefore, desire to be limited to the exact construction shown, although I deem the same preferable in use.

What I claim as my invention is:

1. In a friction hinge for sectional wind shields, the combination with a tubular bearing member attachable to one of the shield sections and having a conical bearing surface formed on one side thereof, of a circular head adapted to be carried by the complementary shield section, slotted transversely and having a conical face engaging one of the cone surfaces upon the tubular bearing, a disk formed with a conical periphery for engagement with the complementary cone surface upon the tubular member and having a projection engaging the slot in the head member and interlocking the members against independent movement, and a clamping bolt extending through the disk, and tubular bearings, and having a screw threaded engagement with the head member.

2. In a friction hinge for wind shields, the combination with an unbroken tubular member formed internally with complementary conical bearing surfaces, of interlocking head and disk members upon opposite sides of the tubular member, held against relative rotation and having each a conical bearing surface engaging the corresponding cone surface upon said tubular member, and means for affecting the relative adjustment between the members to vary the friction of the joint.

In testimony whereof I affix my signature in presence of two witnesses.

EDWARD L. ACKERMAN.

Witnesses:
 JAMES P. BARRY,
 ADELAIDE I. ADAMS.